US008185889B2

(12) United States Patent
Kinder et al.

(10) Patent No.: US 8,185,889 B2
(45) Date of Patent: May 22, 2012

(54) METHODS AND SYSTEMS FOR PORTING SOFTWARE PACKAGES FROM ONE FORMAT TO ANOTHER

(75) Inventors: Nathan G. Kinder, Castro Valley, CA (US); Matthew Harmsen, Los Altos, CA (US)

(73) Assignee: Red Hat, Inc., Raleigh, NC (US)

( * ) Notice: Subject to any disclaimer, the term of this patent is extended or adjusted under 35 U.S.C. 154(b) by 1363 days.

(21) Appl. No.: 11/765,100

(22) Filed: Jun. 19, 2007

(65) Prior Publication Data
US 2008/0320465 A1     Dec. 25, 2008

(51) Int. Cl.
*G06F 9/445* (2006.01)

(52) U.S. Cl. ........ 717/174; 717/136; 717/137; 717/138; 717/176; 717/177; 717/178

(58) Field of Classification Search .................. 717/176, 717/177, 178, 137, 138
See application file for complete search history.

(56) References Cited

U.S. PATENT DOCUMENTS

| | | | | |
|---|---|---|---|---|
| 6,063,134 A * | 5/2000 | Peters et al. | ................ | 717/176 |
| 6,117,187 A * | 9/2000 | Staelin | ................ | 717/169 |
| 6,675,382 B1 * | 1/2004 | Foster | ................ | 717/177 |
| 7,150,014 B2 * | 12/2006 | Graupner et al. | ............ | 717/174 |
| 7,266,817 B1 * | 9/2007 | Barrett | ................ | 717/174 |
| 7,346,904 B2 * | 3/2008 | Fisher et al. | .............. | 717/177 |
| 7,634,771 B2 * | 12/2009 | Benjes et al. | .............. | 717/174 |
| 7,827,549 B2 * | 11/2010 | Tarassov | ................ | 717/174 |
| 2003/0163807 A1 * | 8/2003 | Drake et al. | ............. | 717/174 |
| 2003/0233490 A1 * | 12/2003 | Blaser et al. | ............. | 709/328 |
| 2004/0060035 A1 * | 3/2004 | Ustaris | ................ | 717/100 |
| 2005/0055692 A1 * | 3/2005 | Lupini et al. | ............. | 717/174 |
| 2007/0061801 A1 * | 3/2007 | Chang et al. | ............. | 717/174 |
| 2007/0271552 A1 * | 11/2007 | Pulley | ................ | 717/120 |
| 2008/0127171 A1 * | 5/2008 | Tarassov | ............... | 717/174 |

OTHER PUBLICATIONS

Gagne, "Cooking with Linux", 2000.*
Rodgers et al. "A Management System for Network-Sharable Locally Installed Software: Merging RPM and the Depot Scheme Under Solaris", 2001.*
Sweet, "Software Distribution Using the ESP Package manager", 2006.*
Andrade et al., "Forms2Net—Migrating Oracle Forms to Microsoft .NET", 2006.*
Miller, "Using the RPM package manager for TEX packages", 2005, vol. 26.*
Kuznetsov, "Porting Cleo Software to Linux", Sep. 25, 2004.*
Banginwar et al., "Linux Standard Base Development Kit for Application Building/Porting", 2005.*

(Continued)

*Primary Examiner* — Phillip Nguyen
(74) *Attorney, Agent, or Firm* — Lowenstein Sandler PC

(57) ABSTRACT

An RPM subsystem can be installed on a system that has its own native packaging subsystem. The RPM subsystem is initially delivered as a package wrapped in the non-RPM format of the native packaging system and installed. When an RPM package is installed, the RPM subsystem is also configured to create a stub entry in the native packaging, non-RPM system. The stub entry may contain the normal package information, such as name, version, description, as well as a list of files contained in a package. The stub may also contain uninstallation logic, which serves as a "callback" into the RPM subsystem during package removal and causes the RPM subsystem to remove the package when invoked. Removal of a RPM package via RPM tools also causes the removal of the stub entry.

15 Claims, 3 Drawing Sheets

OTHER PUBLICATIONS

Banginwar et al., "Linux Standard Base Development Kit for Application Building/Porting", 2005.*

Tristan Miller, "Using the RPM Package Manager for TEX packages", 2005.*

* cited by examiner

METHODS AND SYSTEMS FOR PORTING SOFTWARE PACKAGES FROM ONE FORMAT TO ANOTHER

DESCRIPTION OF THE INVENTION

1. Field of the Invention

Embodiments of the present invention relate to software packaging, and more specifically to cross-platform software package generation.

2. Background of the Invention

Package management systems and installers are used to automate the process of installing, updating, configuring and removing software packages from a computer. Package management systems are typically a part of an operating system, and use a single installation database such that users can verify and manage all packages on the system. An installer, on the other hand, is bundled with a particular software package and manages only that software package with which it is bundled.

A software package includes one or more files that are necessary to execute a computer program, or add features to a pre-installed program. In addition to the software itself, packages also contain other important information such as the program name, a description of its purpose, the version number, and the vendor. Packages also often include a list of dependencies which identify other packages that are required for the software to run properly.

Software packages can be configured in many different package formats, depending on the operating systems on which they will be used. Many operating systems use standardized package formats that are native to that operating system, otherwise known as native software packages. The use of such native software packages is typically limited to a single operating system. Current mechanisms for re-packaging software into a format supporting a different operating system are cumbersome to use and require significant user interaction.

Therefore, it would be desirable to provide methods and systems that allow packages to be generated in the native format of the target operating system.

BRIEF DESCRIPTION OF THE DRAWINGS

The accompanying drawings, which are incorporated in and constitute a part of this specification, illustrate embodiments of the invention and together with the description, serve to explain the principles of the invention. In the figures.

DESCRIPTION OF THE EMBODIMENTS

The present invention provides for installing an RPM subsystem on a system that has its own native packaging subsystem. The RPM subsystem is initially delivered as a package wrapped in the non-RPM format of the native packaging system and installed. An administrator may then install RPM packages using the RPM tools of the RPM subsystem. When an RPM package is installed, the RPM subsystem is also configured to create a stub entry in the native packaging, non-RPM system. The stub entry may contain the normal package information, such as name, version, description, as well as a list of files contained in a package. The stub may also contain uninstallation logic, which serves as a "callback" into the RPM subsystem during package removal and causes the RPM subsystem to remove the package when invoked. Removal of a RPM package via RPM tools also causes the removal of the stub entry. Accordingly, both the RPM subsystem and native packaging, non-RPM subsystem may have consistent states.

Of note, the present invention has several advantages over known technologies. For example, developers need not build multiple package formats. Instead, the present invention allows the developer to build packages using RPM tools, yet allow for cross compatibility on systems with non-RPM subsystems. The present invention also allows RPM packages to depend on non-RPM packages. Alternatively, non-RPM packages may now depend on RPM packages by using a dependency that points to the stub entry created by the RPM subsystem. The present invention allows RPM packaging tools to now manage non-RPM packages. For example, RPM tools may now be capable of querying and listing installed packages on both the RPM and non-RPM subsystems. Alternatively, if desired, the native packaging, non-RPM subsystem may employ its own tools to now manage RPM packages.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

Figure 1:
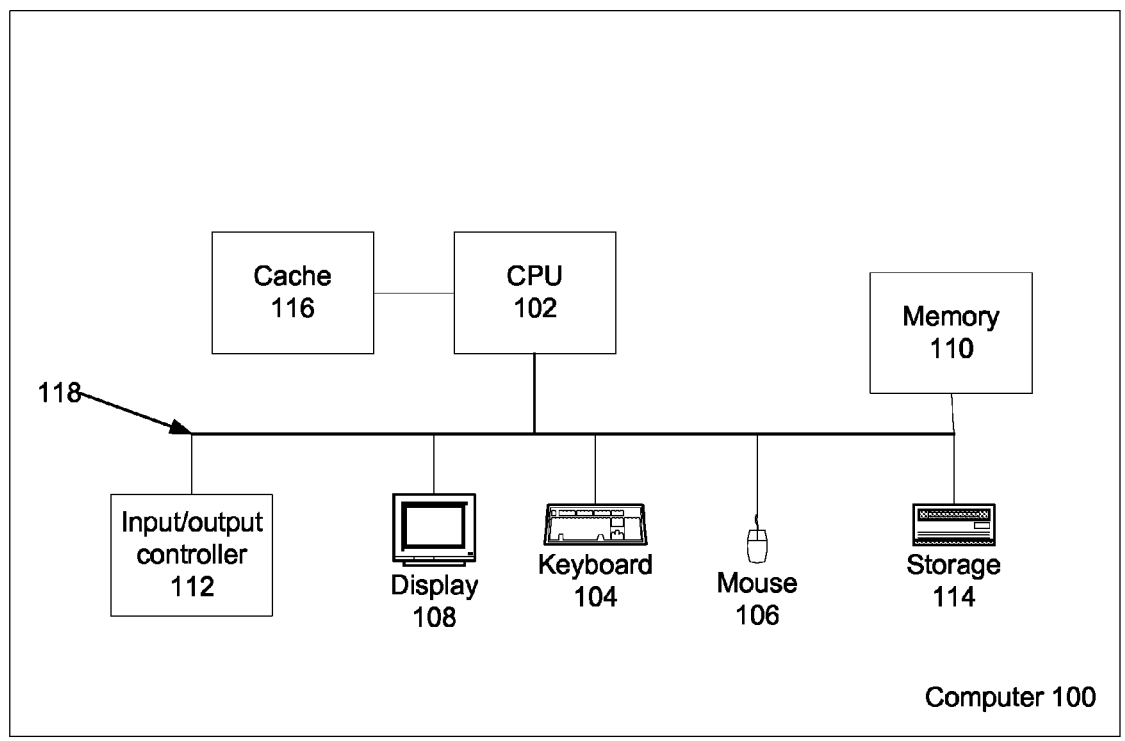
FIG. 1 illustrates an exemplary computer in which the present invention may be employed.
Figure 2:
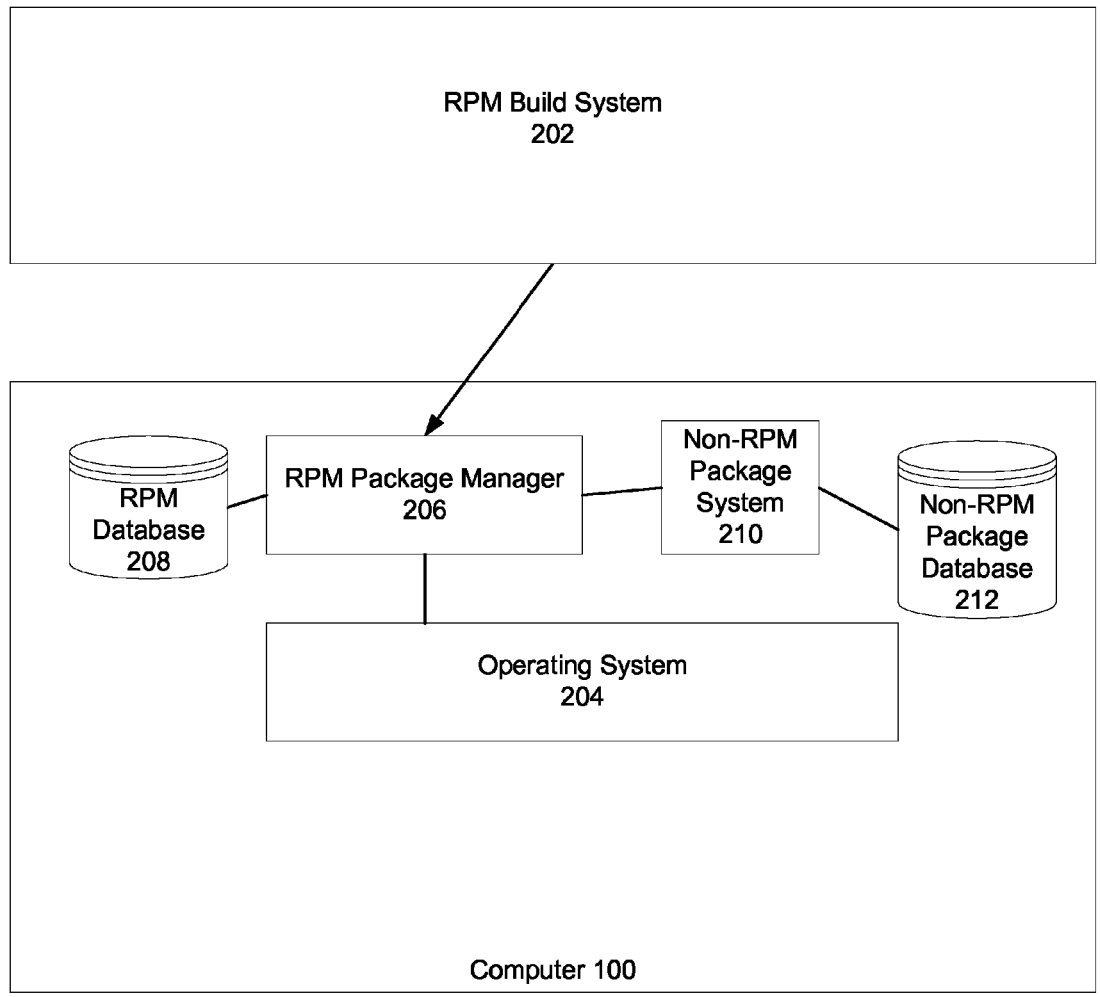
FIG. 2 illustrates an exemplary system architecture that illustrates the principles of the present invention.
Figure 3:
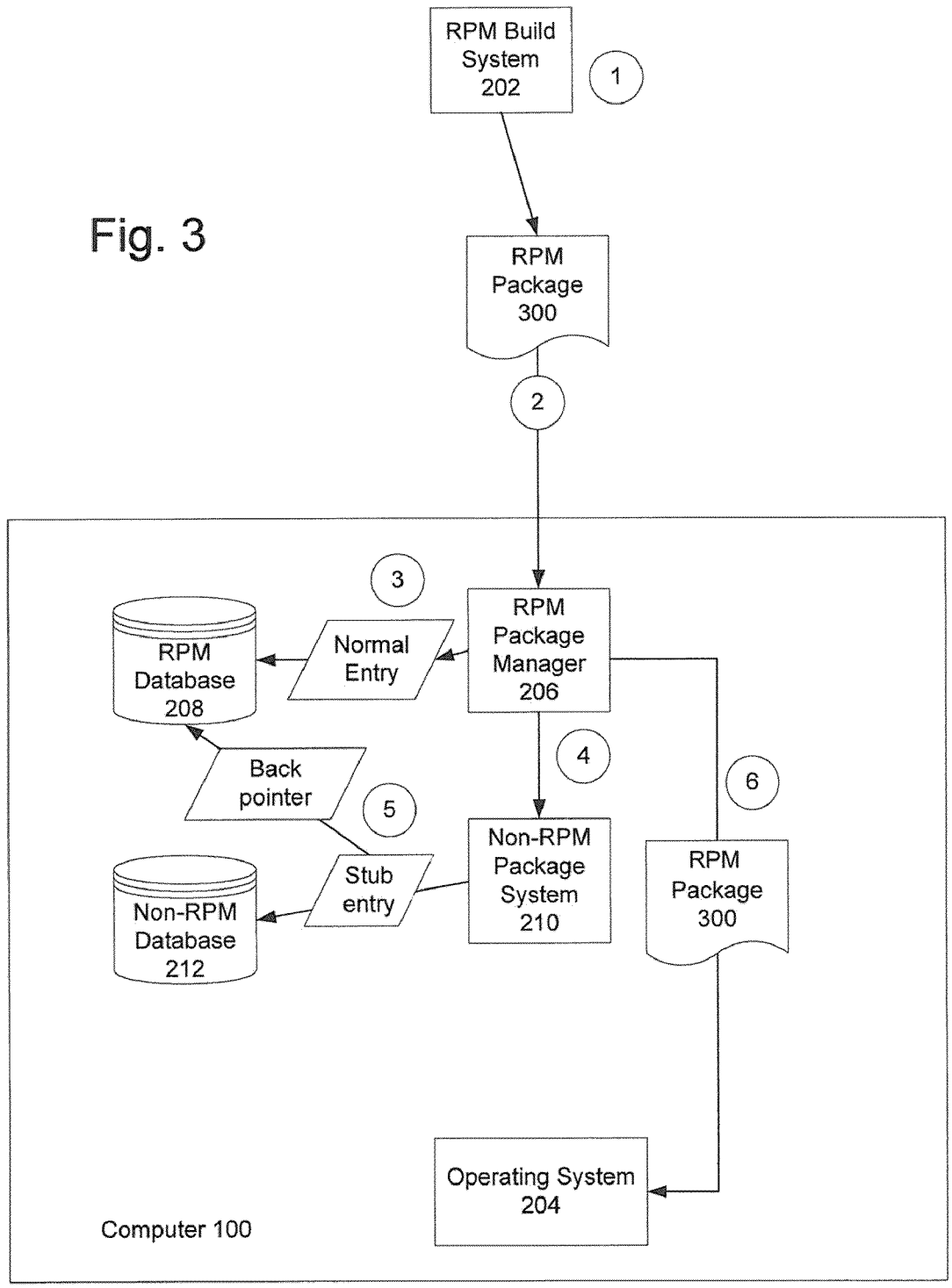
FIG. 3 illustrates an exemplary process flow for the present invention.

Reference will now be made in detail to the exemplary embodiments of the invention, which are illustrated in the accompanying drawings. Wherever possible, the same reference numbers will be used throughout the drawings to refer to the same or like parts. FIG. 1 is provided to illustrate the typical structure of a client or server computer in which the present invention may be employed. FIG. 2 illustrates an overall system architecture for porting non-RPM packages via RPM packages. Finally, FIG. 3 illustrates a general process flow for installing a non-RPM package via the RPM package manager system. These figures will now be described in turn.

FIG. 1 illustrates an exemplary computer 100 in which the present invention may be employed. As shown, computer 100 is shown comprising a central processor 102, a keyboard 104, a mouse 106, a display 108, a main memory 110, an input/output controller 112, a storage device 114, a cache 116, and a system bus 118. These components may be implemented based on hardware and software that is well known to those skilled in the art.

The components shown in FIG. 1 are merely exemplary. Those skilled in the art will recognize that various components may be added or removed from computer 100 based on its function and use. For example, computer 100 may be employed as a client or server computer. For purposes of illustration, the present disclosure describes computer 100 implementing a typical Linux installation for its operating system. Such types of implementations are well known. However, one skilled in the art will also recognize that other operating systems, such as Microsoft Windows, Sun Solaris, HP-UX, AIX, and UNIX are also within the principles of the present invention.

FIG. 2 illustrates an exemplary system architecture that illustrates the principles of the present invention. As shown, system 200 comprises a build system 202 and computer 100, which is the target of installation.

Build system 202 is a suite of tools designed to assist in making various source code packages for UNIX and Linux systems. Build system 202 may be implemented using well known software. For example, the GNU project provides the well known GNU build system that is widely used in many UNIX and Linux packages. Build system 202 provides an environment to a software developer, which allows them to assemble and build packages of software.

In the present invention, build system 202 may be configured to build an RPM package. In some embodiments, this process uses scripting. Scripting may be used to automate the wide variety of tasks, such as packaging binary code, running tests and deployment to production systems. Of course, one skilled in the art will recognize that a developer using build system 202 may perform these tasks manually, or a combination of manual tasks with automated scripts.

Computer 100 is the target of the package built by build system 202 and is further shown comprising a host operating system 204, a RPM package manager system 206, a RPM database 208, a non-RPM package management system 210, a non-RPM package database 210. These components will now be further described.

Operating system 204 is the set of programs that manage the resources of computer 100 (such as the hardware resources shown in FIG. 1). For example, operating system 202 performs basic tasks, such as controlling and allocating memory, prioritizing system requests, controlling input and output devices, facilitating network connections, and managing file systems. Several operating systems are well known such as Windows from the Microsoft Corporation, Mac OS from Apple Computer Inc., and UNIX. For purposes of illustration, the present disclosure explains the present invention as it would be applied to the Linux operating system.

In order to install software on computer 100 where operating system 204 is Linux, computer 100 may further comprise Linux package management software. In particular, computer 100 may be configured to utilize Linux RPM packages and the RPM package manager system. RPM refers to both to a software package file format and a software tool which installs, updates, uninstalls, verifies and queries software packaged in this format. RPM was intended primarily for Linux distribution; however, RPM is used in other operating systems, such as Novell's NetWare and IBM's AIX. Therefore, those skilled in the art will recognize that the present invention may be applied to many different operating systems.

RPM package manager system 206 is a collection of tools to automate the process of installing, upgrading, configuring, and removing software packages, such as RPM packages. RPM packages are usually encapsulated into a single file. As well as the software itself, RPM packages often include other important information, such as the full name, a description of its purpose, the version number, vendor of the software, checksum information, and a list of other packages, known as dependencies, that are required for the software to run properly.

In some embodiments, RPM package manager system 206 is a subsystem installed on computer system 100. For example, RPM package manager system 206 may be installed and configured as a subsystem to another native packaging system that utilizes a non-RPM format, such as HP-UX, AIX, and the like. Thus, RPM package manager system 206 could initially be delivered to system 100 within a non-RPM package, which is then installed on system 100. Once installed, however, an administrator of system 100 could use the tools of RPM package manager system 206 to install RPM packages in accordance with the present invention.

RPM database 208 is a database containing all of the meta-information of the installed RPMs and may comprise other multiple databases used for indexing purposes. RPM database 208 is used to keep track of all files that are changed and created when a user installs a program on computer 100 and thus allows RPM system 206 to upgrade or remove packages.

Non-RPM package management system 210 refers to any non-RPM package management system installed 210. For example, non-RPM package management system 210 may be any of a wide variety of package management systems that are in common use today. For example, non-RPM package management system 210 may be a Solaris, HP-UX, or Microsoft .NET system.

Non-RPM package database 212 refers to any non-RPM package database. Such databases are well known to those skilled in the art.

FIG. 3 illustrates an exemplary process flow for the present invention. In order to assist in understanding the present invention, FIG. 3 shows the process flow as well as the locations of execution. Of note, FIG. 3 provides a general indication of the phases in the process flow. However, one skilled in the art will recognize that the order of execution of these phases may be changed. The process flow shown in FIG. 3 will now be further described.

In phase 1, build system 202 prepares an RPM package 300. For example, build system 202 may execute a series of scripts to collect a set of one or more files to create RPM package 300.

In addition, RPM build system 202 may create a spec file to indicate the contents of RPM package 300 and logic for porting RPM package 300 to non-RPM package system 210. The spec file provides information describing how RPM package was created. Spec files end in the ".spec" extension and contain the package name, version, RPM revision number, steps to build, install, and clean a package, and a changelog. Of note, multiple packages can be built from a single RPM spec file, if desired.

In phase 2, RPM build system 202 provides RPM package 300 to computer 100. RPM build system 202 may deploy RPM package 300 in various ways. For example, computer 100 may download RPM package 300 directly from build system 202. Alternatively, RPM build system 202 may save RPM package 300 to one or more repositories, which are accessible to computer 100. Processing may then flow to phase 3.

In phase 3, computer 100 receives RPM package 300 and begins processing it for installation. Within computer 100, RPM package manager system 206 reads and parses RPM package 300. For example, RPM package 300 may comprise various sections. The lead section identifies RPM package 300 as an RPM file and contains header information. A signature section can also be used by RPM package manager system 206 to ensure integrity and/or authenticity of RPM package 300. A header contains meta-information about RPM package 300 including package name, version, architecture, file list, etc.

In response to receiving RPM package 300, RPM package manager system 206 writes an entry into RPM database 208. In some embodiments, RPM package manager system 206 writes a typical entry into RPM database 208. For example, the entry may comprise information, such as a name, version, and description of files contained in RPM package 300.

In phase 4, RPM package manager 206 is also configured create a stub package that emulates RPM package 300 in the native packaging, non-RPM format of non-RPM package system 210. and provides this stub package to non-RPM package system 210. RPM package manager system 206 may interface with non-RPM package system 210 utilizing an application programming interface or a script.

In phase 5, non-RPM package system 210 then writes a stub entry, which essentially corresponds to the entry in RPM database 208 for RPM package 300. The stub entry simulates an entry for an actual RPM package, and thus, may comprise various information typical for tracking and maintaining non-RPM package 300 as if it were a RPM package. For example, the stub entry may comprise information, such as a name, version, and a description of the files contained in RPM package 300. In addition, stub entry may comprise logic, a piece of code, or script that may be used to interface with the native packaging package system of non-RPM package 300. This logic or code may be provided to serve as uninstallation logic or "callback" into RPM package manager 206 and vice versa. Thus, if RPM package manager 206 removes RPM package 300, then the stub entry in non-RPM database 212 would also be removed. Likewise, if non-RPM package system 210 removes the stub entry, then the uninstallation logic would invoke the uninstallation tools of RPM package system 206.

Meanwhile, in phase 6, RPM package system 206 installs RPM package 300 into operating system 204. During installation, RPM package system 206 puts the program in RPM package 300 so that it can be executed. This processing typically entails unpacking the code in RPM package 300 configuring computer 100 to store the relevant files. RPM package system 206 may also change various settings so that the program can operate correctly. For example, common operations performed during software installations include creation or modification of: shared and non-shared program files; folders and directories; configuration file entries; and environment variables.

Of note, the present invention allows for cross dependencies between RPM and non-RPM packages. For example, with the present invention, RPM package 300 may contain dependencies to non-RPM packages. Likewise, non-RPM packages may contain dependencies to RPM packages 300 through use of the stub entry. Furthermore, RPM package manager system 206 may manage non-RPM packages, or non-RPM package manager system 210 manage RPM packages in accordance with the present invention.

Other embodiments of the invention will be apparent to those skilled in the art from consideration of the specification and practice of the invention disclosed herein. For example, as noted above, one skilled in the art will recognize that the present invention eases management of upgrades and deinstallation. In particular, a user could request deinstallation of RPM package 300 based on its stub entry. RPM package manager 206 may then interface or initiate non-RPM package management system 210 to complete the deinstallation. This allows a user of computer 100 to utilize RPM package manager 206 as a single point of control for non-RPM packages as well as RPM packages. Nonetheless, it is intended that the specification and examples be considered as exemplary only, with a true scope and spirit of the invention being indicated by the following claims.

What is claimed is:

1. A method of installing a RPM Package Manager (RPM) package on a target machine, said method comprising:
  receiving the RPM package, wherein the RPM package is in a .rpm format;
  generating a non-RPM package that emulates the RPM package;
  providing the non-RPM package to a non-RPM package manager system that is native to the non-RPM package;
  writing, by the non-RPM package manager system, an entry for the RPM package in a non-RPM database on the target machine, wherein the entry comprises program code that is linked to an entry in an RPM database, wherein the RPM database comprises information indicating RPM packages that have been installed on the target machine; and
  installing the RPM package via a RPM subsystem installed on the target machine.

2. The method of claim 1, wherein generating the non-RPM package that emulates the RPM package comprises generating a HP-UX package.

3. The method of claim 1, wherein generating the non-RPM package that emulates the RPM package comprises generating a Microsoft .NET package.

4. The method of claim 1, wherein generating the non-RPM package that emulates the RPM package comprises generating a SysV package.

5. The method of claim 1, wherein writing the entry for the RPM package in the non-RPM database comprises writing a stub entry in the non-RPM database for the RPM package.

6. An apparatus comprising:
  a memory containing instructions; and
  a processor coupled to the memory and configured to execute the instructions to
    receive a RPM Package Manager (RPM) package, wherein the RPM package is in a .rpm format;
    generate a non-RPM package that emulates the RPM package;
    provide the non-RPM package to a non-RPM package manager system that is native to the non-RPM package;
    write, by the non-RPM package manager system, an entry for the RPM package in a non-RPM database on the target machine, wherein the entry comprises program code that is linked to an entry in an RPM database, wherein the RPM database comprises information indicating RPM packages that have been installed on the apparatus; and
    install the RPM package via a RPM subsystem installed on the apparatus.

7. A non-transitory computer readable medium comprising instructions when executed by a processor cause the processor to
  receive a RPM Package Manager (RPM) package, wherein the RPM package is in a .rpm format;
  generate a non-RPM package that emulates the RPM package;
  provide the non-RPM package to a non-RPM package manager system that is native to the non-RPM package;
  write, by the non-RPM package manager system, an entry for the RPM package in a non-RPM database on a target machine, wherein the entry comprises program code that is linked to an entry in an RPM database, wherein the RPM database comprises information indicating RPM packages that have been installed on the target machine; and
  install the RPM package via a RPM subsystem installed on the target machine.

8. A computer configured to run software installed in packages, said computer comprising:
  a RPM Package Manager (RPM) database containing information indicating RPM packages that have been installed on the computer;

a RPM package manager system receiving a RPM package, wherein the RPM package is in a .rpm format, and generating a non-RPM package that simulates the RPM package; and a non-RPM package manager system writing a stub entry for the non-RPM package to simulate information in the RPM database, wherein the RPM package manager system is removing the stub entry in the non-RPM database upon removal of the RPM package.

9. The computer of claim 8, wherein the RPM package manager system generates packages for a HP-UX package management system.

10. The computer of claim 8, wherein the RPM package manager system generates packages for a Solaris package management system.

11. The computer of claim 8, wherein the RPM package manager system generates packages for a Microsoft .NET framework system.

12. The computer of claim 8, wherein the RPM package manager system comprises a utility that interfaces the non-RPM package manager system.

13. The computer of claim 8, wherein the non-RPM package manager system writes a stub entry comprising logic that invokes an uninstallation tool of the RPM subsystem.

14. The computer of claim 8, wherein the RPM packages contain one or more dependencies to non-RPM packages.

15. The computer of claim 8, wherein non-RPM packages contain dependencies to RPM packages.

* * * * *